JOHN R. STRICKLAND, OF SAYVILLE, NEW YORK.

Letters Patent No. 92,394, dated July 6, 1869.

IMPROVED COMPOUND FOR CURE OF DROPSY.

The Schedule referred to in these Letters Patent and making part of the same.

*To all whom it may concern:*

Be it known that I, JOHN R. STRICKLAND, of Sayville, in the county of Suffolk, and State of New York, have invented a new and useful Compound for the Relief of Dropsy; and I do hereby declare the following to be a full, clear, and exact description of the said invention, and of the mode of preparing the said compound.

After a considerable experience in the treatment of dropsy, and various experiments, in order to discover the proportions of ingredients that have the most beneficial effect in curing or relieving those afflicted with dropsy, I have discovered the following as the best proportions and mode of preparing the compound:

I take three pounds of milkweed-root, one pound of dandelion-root, and one pound of sarsaparilla-root, and one gallon of water, or in about that proportion.

I boil these together, and remove any scum, and add to the infusion about four pounds of sugar, and boil the mass down to about three quarts; and I prefer to add about one gill of gin, which aids in preserving the compound.

This composition I have found to benefit persons afflicted with dropsy, and, in most cases, to entirely cure them.

The quantity of this compound that is taken for a dose will vary, according to the condition of the patient, from a teaspoonful daily to a larger dose.

What I claim, and desire to secure by Letters Patent, is—

The aforesaid compound, prepared in the manner set forth, and for the purposes specified.

In witness whereof, I have hereunto set my signature, this 9th day of June, A. D. 1869.

JOHN R. STRICKLAND.

Witnesses:
    CHAS. H. SMITH,
    GEO. T. PINCKNEY.